United States Patent [19]

Lambregts

[11] 4,373,184
[45] Feb. 8, 1983

[54] VERTICAL FLIGHT PATH STEERING SYSTEM FOR AIRCRAFT

[75] Inventor: Antonius A. Lambregts, Renton, Wash.

[73] Assignee: The Boeing Company, Seattle, Wash.

[21] Appl. No.: 107,464

[22] Filed: Dec. 26, 1979

[51] Int. Cl.³ .................... G06F 15/50; G06G 7/78; G05D 1/08
[52] U.S. Cl. .................... 364/434; 244/196; 340/27 AT; 364/430
[58] Field of Search ............... 364/434, 430, 428, 443; 244/181, 185, 186, 187, 188, 194, 195, 196, 197; 340/25, 27 R, 27 NA, 27 AT; 318/583, 584

[56] References Cited

U.S. PATENT DOCUMENTS

| 2,553,983 | 5/1951 | Saxman, Jr. | 318/583 X |
|---|---|---|---|
| 2,998,945 | 9/1961 | Meyers | 244/196 |
| 3,096,955 | 7/1963 | Priestly | 244/188 |
| 3,106,903 | 10/1963 | Bentkowsky et al. | 318/584 X |
| 3,386,689 | 6/1968 | Parker et al. | 244/184 X |
| 3,399,849 | 9/1968 | Hendrick | 244/187 X |
| 3,422,418 | 1/1969 | Simoneau | 244/197 X |
| 3,521,227 | 7/1970 | Congleton et al. | 340/27 NA |
| 3,521,839 | 7/1970 | Diani | 244/184 X |
| 3,681,580 | 8/1972 | Gwathmey et al. | 364/434 |
| 3,688,175 | 8/1972 | Rauschelbach | 318/584 X |
| 3,705,306 | 12/1972 | Lydon et al. | 364/430 |
| 3,752,967 | 8/1973 | Victor | 364/430 X |
| 3,781,628 | 12/1973 | Rauschelbach | 318/584 |
| 3,807,666 | 4/1974 | Devlin | 244/196 X |
| 3,848,833 | 11/1974 | Rauschelbach | 364/110 |
| 3,920,966 | 11/1975 | Knemeyer | 318/584 |
| 3,927,306 | 12/1975 | Miller | 244/186 X |
| 3,955,071 | 5/1976 | Lambregts | 244/182 X |
| 3,967,799 | 7/1976 | Muller | 364/430 X |
| 3,970,829 | 7/1976 | Melvin | 364/434 |

Primary Examiner—Joseph F. Ruggiero
Attorney, Agent, or Firm—James P. Hamley; Bernard A. Donahue

[57] ABSTRACT

Disclosed is a vertical flight path angle steering system for aircraft, utilizing a digital flight control computer which processes pilot control inputs and aircraft response parameters into suitable elevator commands and control information for display to the pilot on a cathode ray tube. The system yields desirable airplane control handling qualities and responses as well as improvements in pilot workload and safety during airplane operation in the terminal area and under windshear conditions.

10 Claims, 14 Drawing Figures

VERTICAL FLIGHT PATH STEERING SYSTEM FOR AIRCRAFT

BACKGROUND OF THE INVENTION

The invention described herein was made in the performance of work under a NASA contract No. NAS1-14880 and is subject to the provisions of Section 305 of the National Aeronautics and Space Act of 1948, Public Law 85-568 (72 Stat. 435; 42 USC 2457).

This invention pertains to the aircraft art and, more particularly, to an improved control wheel steering apparatus for the same.

The recent economic pressures to increase operating efficiencies of commercial transports have resulted in more stringent requirements for airplane control, more sophisticated air traffic control procedures and closer adherence to published schedules, regardless of occasional overcongested terminal areas and marginal weather conditions.

These developments have had a tendency to increase pilot workload and, consequently, to degrade flight safety. Automation of functions or operations can reduce the pilot workload associated with certain tasks. For example, the current trend in the development of automatic flight control systems is toward fully automated guidance and control, taking performance optimization and air traffic constraints into consideration. Also, a careful simplification and integration of new and existing control and monitoring functions is required to prevent the ever increasing number of new tasks from increasing the overall pilot workload, and allow the pilot to take maximum advantage of the sophisticated on-board equipment during manual control operations.

A relatively large percentage of the flight operations remain dependent on the pilot's ability to fly the airplane manually in a sophisticated operating environment. This is so due to the lack of (or inadequate) ground guidance facilities (ILS, MLS, DME's, VOR's, etc.), equipment breakdowns, or abnormal air traffic control situations. These conditions can generate an almost instantaneous diversion of pilot attention and increase the pilot's workload. Potential encounters with windshear further increase the risk associated with such conditions.

The capability for the pilot to assume manual control of the aircraft in such an environment, at any time, while maintaining the same safety and performance levels with minimal increase in pilot workload, is needed in commercial transport airplanes to complement the automatic flight modes.

A first contribution toward meeting this need was the design of a semiautomatic airplane control mode called Attitude Control Wheel Steering, which gives the pilot control over the airplane through his column and wheel, and provides improved control responses and automatic tracking of the aircraft's attitudes as established by the pilot.

Although systems of this type provide improved performance and reduction in pilot workload compared to basic manual airplane control, it has been recognized that a more advanced semiautomatic control mode is needed to further reduce pilot workload and minimize the transition problem from fully automatic to computer augmented manual control.

To meet this need, a control and display system was devised that gives the pilot direct control over the earth referenced flight path angle in the vertical plane and over ground track in the horizontal plane. This system is called a Velocity (Vector) Control Wheel Steering System because it provides control of the total velocity vector of the aircraft relative to the earth. The pilot's column wheel inputs are processed in a computer to provide a proportional rate of change to the control parameters. The pilot closes his control loop by evaluating the changes in flight path angle and/or ground track resulting from his control input on electronic cathode ray tube (CRT) displays. With no pilot control input the last established values of these control parameters are maintained by automatic control. In concert with the control variables also other pertinent information is displayed on these CRTs, so that the pilot can evaluate the complete vertical and horizontal airplane situation.

The main objectives of such a system are to provide the airplane with superior control handling characteristics, simplify manual airplane maneuvering on complex flight paths, increase control precision and provide airplane path tracking stability unaffected by speed changes, configuration changes, turbulence or varying winds. FIGS. 1 and 2 illustrate the nature of the problem.

In FIG. 1, an aircraft 10 is shown approaching a runway 12 on a desired glide slope 14. The inertial velocity vector $V_I$ of the craft 10 is the resultant of an air speed velocity vector $V_A$ and a wind velocity vector $V_W$, here indicated as being a headwind. FIG. 2 illustrates the aircraft 10 approaching the runway 12 on a desired glide slope 14 tailwind landing conditions.

The problem faced by the pilot in either of these conditions is that of maintaining desired inertial flight path angle $\gamma_I$ by changing the airplane's attitude and power setting. Forces caused by turbulence and windshear further add to this problem creating a high pilot workload during landing conditions. If the pilot can simply establish the desired flight path using his column/wheel and corresponding displays, and the automatic system will capture and track this desired flight path, regardless of the above mentioned disturbances, a substantial pilot workload reduction will result.

An early conceptual design for the longitudinal part of this control/display system is shown in FIG. 3. Here, the pilot of the aircraft sets a desired flight path angle $\gamma_c$ by displacement of his column control, indicated generally at 20. The position of the column is sensed by pick-ups which produce a corresponding electrical signal $\delta_{col}$. The column signal $\delta_{col}$ is integrated in the standard integrator 22 thereby producing a signal $\gamma_c$ representative of the commanded flight path angle.

The column signal $\delta_{col}$ is also fed to the first input 24a of the control law circuit 24. The control law circuit also receives at a second input 24b a signal representative of the rate of change of aircraft pitch angle. This signal is available from sensors located on the aircraft. Coupled to the third input 24c of the control law circuit 24 is the output from a summer circuit 26.

In response to its input signals, the control law circuit produces an output command signal $\delta_e$ which controls airplane dynamics, indicated generally at block 28. The airplane dynamics respond to the elevator command signal $\delta_e$ in such a manner that the craft assumes the desired flight path angle. The actual inertial flight path angle is sensed by the aircraft and applied to the input of a cathode ray tube display 30 and to the negative input 26a of the summer 26. Applied to the positive input 26b of summer 26 is the reference flight path angle $\gamma_c$. Thus, summer 26 produces at its output 26c an error signal which, when fed back to the control law circuit at its third input 24c, causes proper response of the output signal $\delta_e$ such that the airplane's flight path angle is corrected to the desired value.

This prior art design did not fulfill the expectations for a Velocity Vector Control Wheel Steering system.

Pilots found it difficult to set up the desired flight path angle and were repeatedly drawn back into the control loop because the displayed flight path angle symbol would not stay at the target value. The objective of this mode—pilot workload reduction—was thus not realized.

It was found that major deficiencies of this prior system could be identified from the time response, an example of which is given in FIG. 4.

The lag between the column input and the response of the flight path angle symbol on the CRT display was too long. As a result, the pilot could not readily assess the long term effect of his inputs and was unable to control the flight path angle precisely.

The transient response of flight path angle to a column input exhibited a relatively large overshoot of the steady state value. This short term response characteristic resulted in a tendency to reverse the column input, which in turn made it difficult to establish the desired long term value of the flight path angle.

The control response was insufficiently damped, contributing to the unsteadiness of the displayed flight path angle symbol.

The unsteadiness of the display, which also resulted from turbulence, made it difficult for the pilot to assess the long term flight path angle trend and resulted in undesired pilot control intervention.

SUMMARY OF THE INVENTION

Accordingly, it is the object of this invention to provide an improved longitudinal Velocity Vector Control Wheel Steering system that overcomes the above mentioned problems associated with prior art control wheel steering systems.

It is further an object of this invention to provide a Velocity Vector Control Wheel Steering system in which the control and display system components are designed in an integrated way, to provide coordinated control and display responses throughout the flight envelope with constant column force per unit normal acceleration and an invariant flight path angle response time constant.

Yet a further object of this invention is to provide a computer augmented manual airplane control system and suitable displays, that take advantage of the on-board avionics data and computing capability to reduce pilot workload by providing superior airplane control handling characteristics, simplifying manual airplane maneuvering capability on complex flight paths, increasing routine control precision and by providing airplane path tracking stability unaffected by speed changes, airplane configuration changes, turbulence and windshear.

Another object of the invention is to provide the desired display information and control characteristics for an improved Velocity Vector Control Wheel Steering by displaying both the actual flight path angle and the commanded flight path angle to the pilot.

Briefly, according to the invention, an aircraft control and display system includes a control reference means for receiving and processing a signal representative of the pilot's steering input and developing a control reference signal proportional to the time integral thereof. Aircraft sensing means produces a signal representative of the aircraft's controlled state. The control reference signal and the signal produced by the aircraft's sensing means are processed through control command means to produce a control surface command that controls the craft's dynamics to smoothly bring the controlled state to track the control reference value. A provided display displays both the control reference value and the aircraft controlled state to the pilot.

DESCRIPTION OF THE INVENTION

Figure 1:
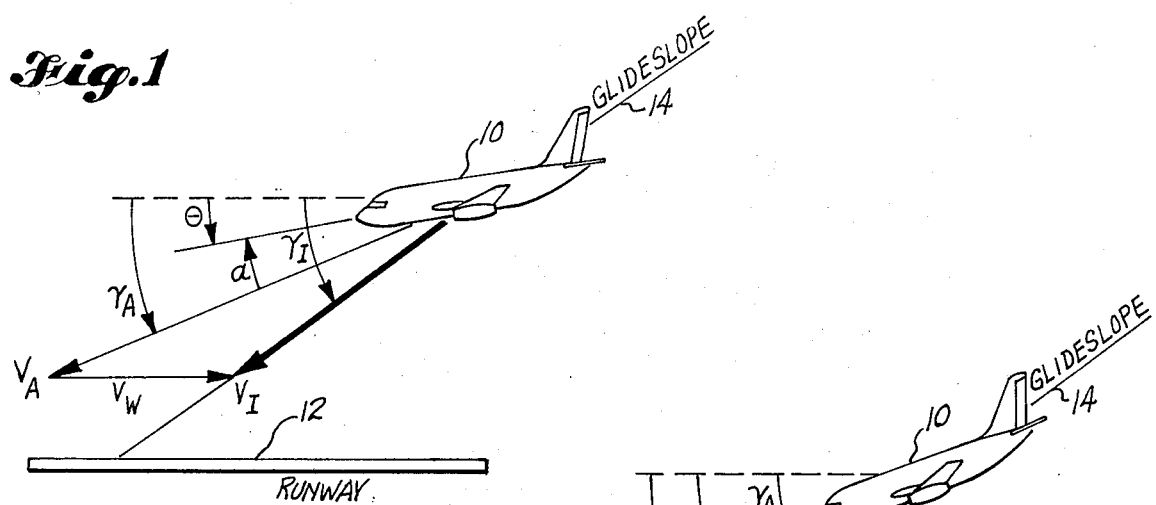
FIGS. 1 and 2 illustrate the changes in relative relationships between the airplane state variables that must occur when the airplane maintains a constant inertial flight path angle while the horizontal wind component changes amplitude and/or direction.
Figure 2:
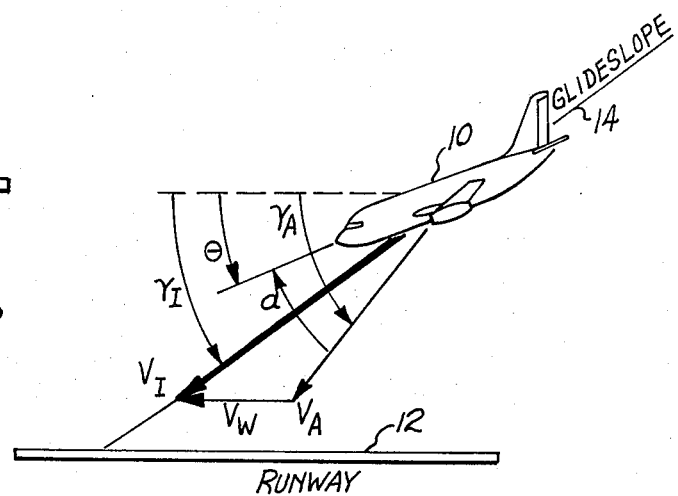
Figure 3:
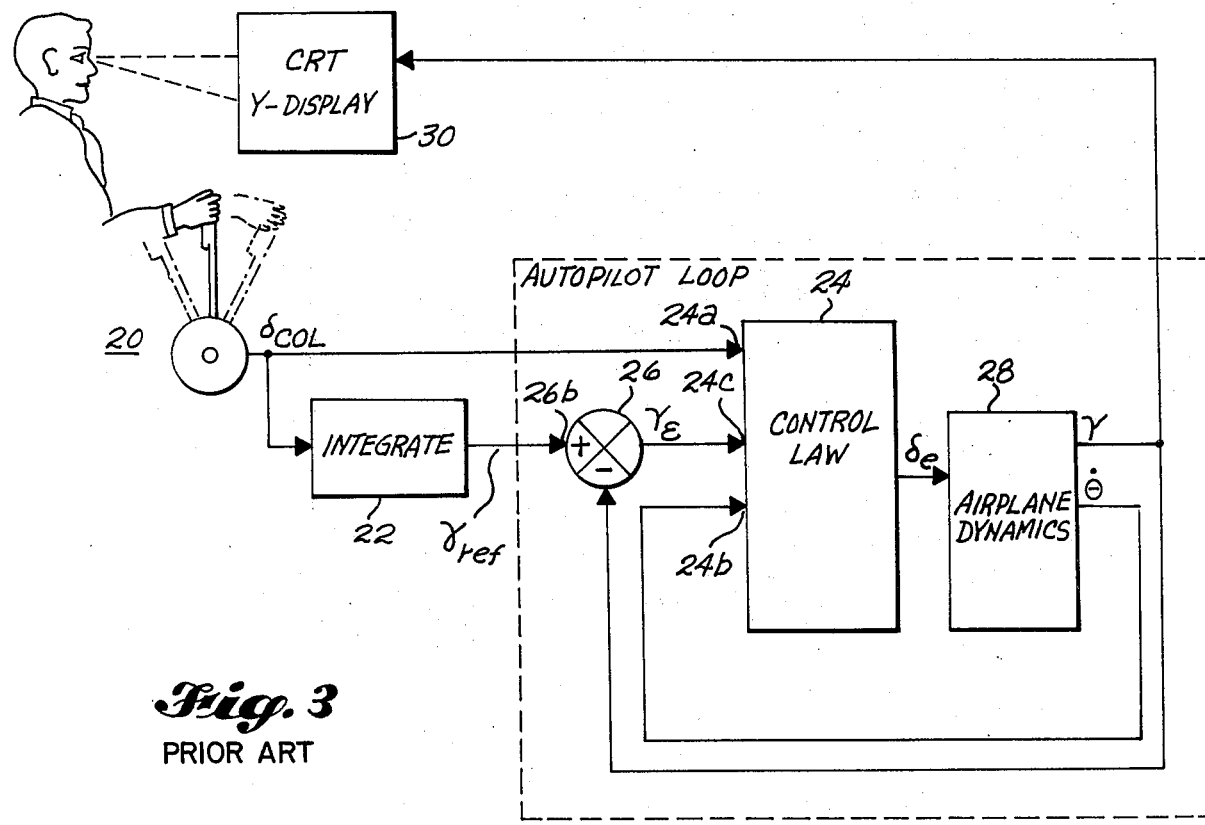
FIG. 3 shows an early conceptual design of a Velocity Vector Control Wheel Steering Control/Display system.
Figure 4:
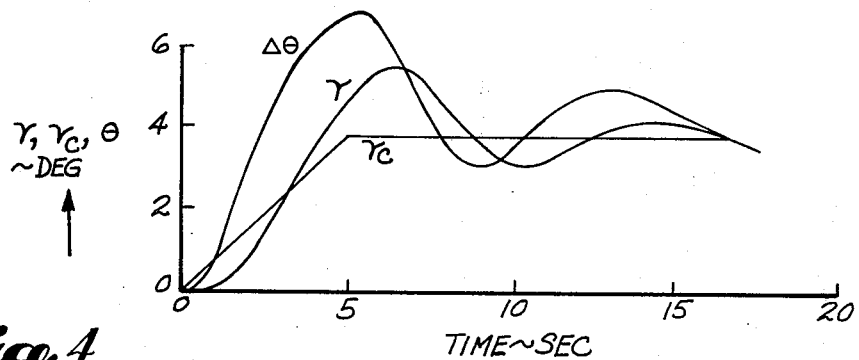
FIG. 4 illustrates the deficiencies in the time response of a prior art system for step column inputs.

The deficiencies of the prior art system, as identified from its response characteristics shown in FIG. 4, helped formulate the desired flight path angle control wheel steering system response characteristics and ultimately the system's design requirements.

Figure 5:
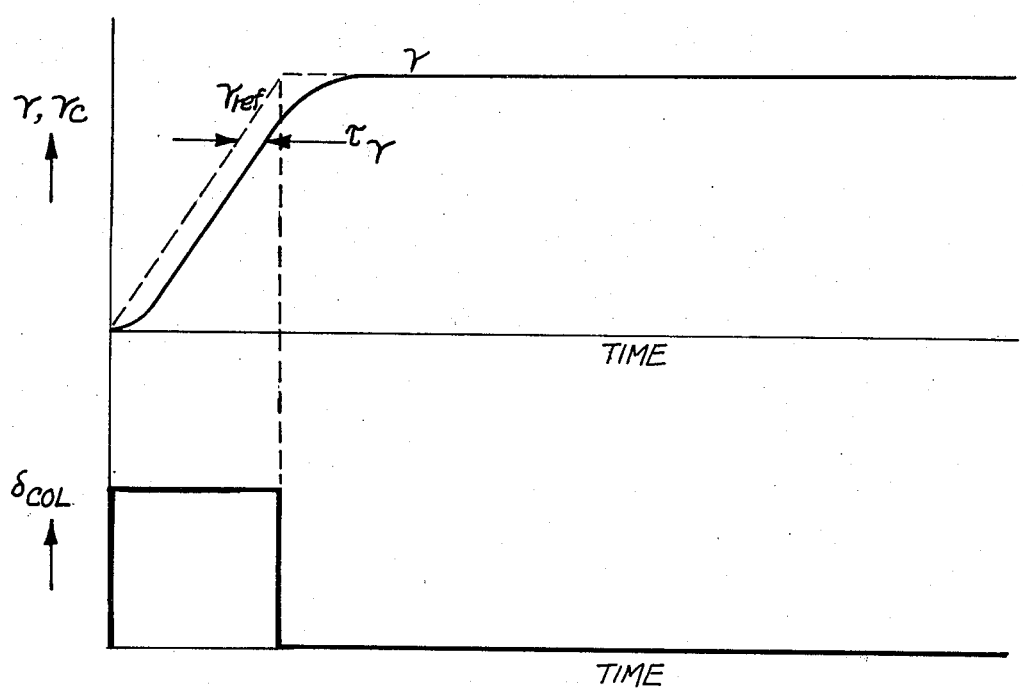
FIG. 5 gives an example of ideal response of the flight path angle to a column input of constant amplitude and limited duration.

Ideally the flight path angle $\gamma$ should respond to a column input of finite duration as shown in FIG. 5. For the duration of the column input, the flight path angle increases with a rate proportional to the magnitude of the column input, then holds constant after the column input is reduced to zero. Since the airplane embodies a certain mass and inertia and limited elevator control authority, the flight path angle will by necessity incur some finite lag $\tau_{65}$. The object of this invention is to provide a control law design having flight path angle responses closely resembling that of FIG. 5, exhibiting minimal response lag, good response damping and proper rate sensitivity for a given column input.

Figure 6:
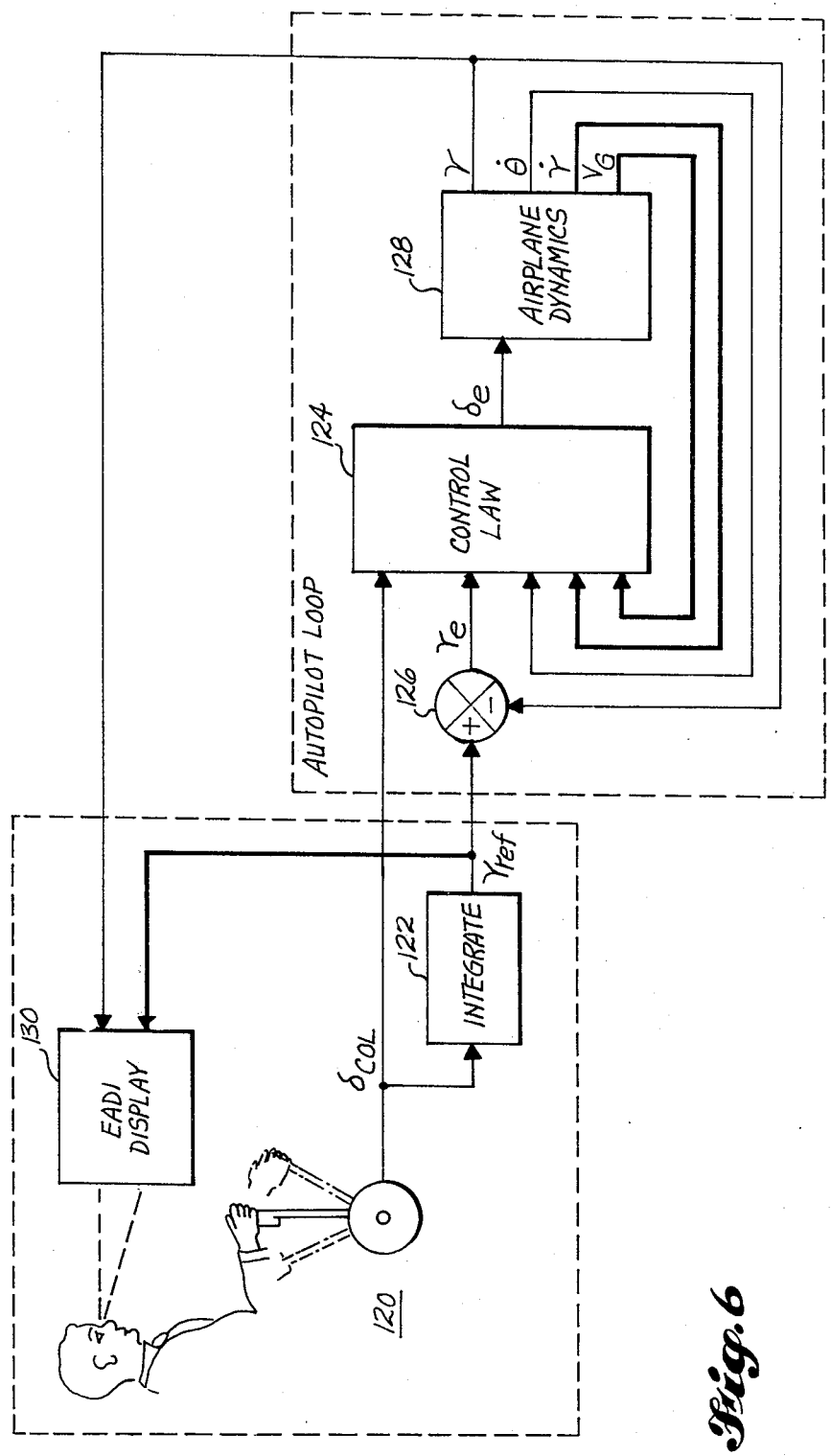
FIG. 6 provides a conceptual block diagram of the improved flight path angle control wheel steering system, including display of the flight path angle command signal for closing the short term pilot control loop and an improved flight path angle control law utilizing rate of change of flight path angle.

The preferred arrangement of the control wheel steering system according to the invention is shown in the conceptual block diagram of FIG. 6. Here, the pilot generates the desired flight path angle command $\gamma_c$ by displacement of his control column 120. Pickups at the control column produce a signal $\delta_{col}$ representative of column position. This signal is integrated in a conventional integrator 122 to produce the signal $\gamma_c$ representative of the commanded flight path angle.

A flight path angle error signal $\gamma_\epsilon$ is formed by taking the difference between this commanded flight path angle $\gamma_c$ and the actual flight path angle $\gamma$, as supplied by airplane dynamics block 128, in combiner 126. The error signal $\gamma_\epsilon$ is used as the main input to the control law block 124. In the improved control law the flight path angle error signal $\gamma_\epsilon$ is processed along with a signal representative of the rate of change of flight path angle $\dot\gamma$, column position $\delta_{col}$, pitch rate $\dot\theta$ and ground speed $V_G$ to form the elevator command $\delta_{ec}$. The signals $\dot\gamma$, $\dot\theta$ and $V_G$ are also produced from airplane dynamics block 128. The proportional column position signal commands the elevator directly for the purpose of achieving a direct and smooth initiation of the maneuver. The elevator command signal $\delta_{ec}$ is applied to the aircraft's elevator control which generates the necessary airplane dynamics to capture and track the commanded flight path angle.

Figure 7:
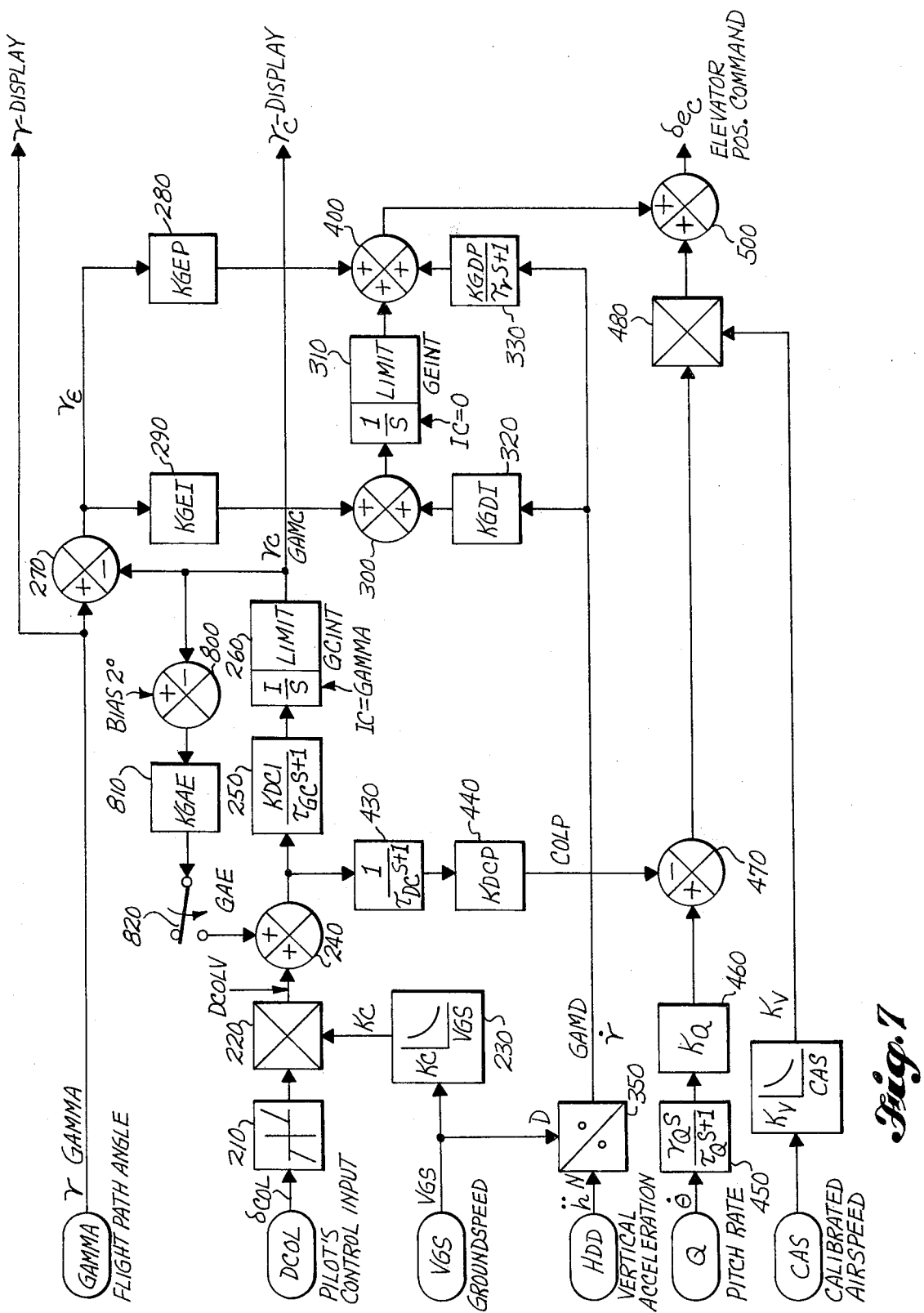
FIG. 7 shows a detailed block diagram of the preferred embodiment of the improved control law of the invention.

FIG. 7 is a detailed schematic diagram illustrating the preferred construction of the control law circuit.

The column position signal $\delta_{col}$ is first processed through a deadzone circuit 210. This is done to assure that the signal input to the control law is zero when the column is in the neutral position. The signal output from the deadzone circuit 210 is next multiplied by a signal KC in multiplier circuit 220 producing a signal DCOLV. A signal KC is produced from the ground speed signal VGS in function generating circuit 230, according to the relationship KC=VO/VGS. VO represents a suitable normalization constant, here 120 kts.

The speed programmed column signal DCOLV is summed with a signal GAE in summer 240 before being used in two signal paths. This GAE signal is normally zero and its function is described in connection with the GO AROUND feature of the control law. In the first signal path the output of summer 240 is amplified and lagged in a circuit 250 and then integrated in integrator 260 to produce the signal $\gamma_c$ representative of the commanded flight path angle. A pilot control column input thus results in a rate of change of the signal $\gamma_c$ which is proportional to the column position and inversely proportional to speed. The inverse speed relationship is provided to achieve proper column sensitivity over the entire aircraft speed range. It is desirable to maintain constant normal acceleration response capability, regardless of speed. Normal acceleration is the product of the speed and the rate of change of flight path angle. It follows then that in order to maintain the nornal acceleration authority constant, the column input signal must vary inversely proportional with speed.

The purpose of the lag circuit 250 will be explained in connection with the problem of providing the required display information to achieve satisfactory handling qualities for the short term pilot control loop.

The flight path angle error signal $\gamma_\epsilon$ is formed in summer 270 by taking the difference between the flight path angle command and the signal GAMMA, representative of the actual flight path angle $\gamma$ of the aircraft. This signal GAMMA is earth referenced and may be obtained from well known prior art sensing and computation sources. The $\gamma_\epsilon$ signal is used to command the elevator through a proportional signal path having a signal amplifier 280, providing signal amplification by a factor KGEP. The $\gamma_\epsilon$ signal is also processed in and integral signal path. For this purpose signal amplifier 290 provides amplification of the $\gamma_\epsilon$ signal by a factor KGEI. This amplified $\gamma_\epsilon$ signal is summed in device 300 with the amplified GAMD signal. The resulting signal is integrated in device 310. The proportional $\gamma_\epsilon$ signal path provides the main elevator control command for reducing the $\gamma_\epsilon$ signal to zero. The $\gamma_\epsilon$ integral path is needed to assure that $\gamma_\epsilon$ will be nulled, even when a steady state elevator needs to be carried or to offset null errors in other signal sources making up the elevator command.

The GAMD signal, which is gain weighted in circuit 320 by a gain factor KGDI before being summed with the gain weighted $\gamma_\epsilon$ signal in summer 300, is representative of the rate of change of the actual flight path angle. It is produced in circuit 350 as the quotient of vertical acceleration and ground speed according to the relationship $\dot\gamma \simeq \ddot h/VGS$. The integral signal path of the GAMD signal is provided to offset the $\gamma_\epsilon$ signal integration after a change in $\gamma_c$. Integration of $\gamma_\epsilon$ by itself would cause the $\gamma_c$ target to be overshot during the transient response, because the output of integrator 310 would have built up to the wrong value at the time the $\gamma_\epsilon$ signal would cross zero. With the GAMD signal input to integrator 310 the integration stops when (KGEI)($\gamma_\epsilon$)+(KGDI)(GAMD)=0, in other words, when the appropriate rate of change of gamma is established.

There is also a proportional signal path of GAMD, including gain/lag circuit 330 with lag $\tau_{65}$. This proportional GAMD signal path provides the main damping term to the control of the flight path angle dynamics. The lag filter cuts down high frequency noise generated by the vertical acceleration sensor.

The gain weighted $\gamma_\epsilon$ signal from circuit 280, the output from integrator 310 and the gain weighted and filtered GAMD signal output from circuit 330 are summed in circuit 400 to form the outer loop flight path angle control signal.

Inner loop pitch damping is provided by the pitch rate signal input (Q), which is first processed through a washout circuit 450, to remove undesirable steady state signal components, then amplified by a factor KQ in circuit 460 before being summed in summer 470 with the gain weighted and filtered column signal COLP. This COLP signal effectively provides the pitch rate command for direct and smooth initiation of the transient maneuver for a column input. It is derived from the speed programmed DCOLV signal to maintain coordination of the initial and steady state pitch rate for a given column input, for the entire speed range. The $\dot\gamma_c/\delta_{col}$ is inversely proportional to VGS and the steady pitch rate must be equal to the rate of change of $\gamma$. Thus the pitch rate command per unit column must also be inversely proportional to VGS. The COLP signal processing contains a small lag provided by circuit 430 for signal noise suppression and a gain circuit 440 for providing the desired signal amplitude. Finally the inner loop signal output from summer 470 is gain programmed in circuit 480 to provide uniform dynamics in the inner loop which is affected by the elevator aerodynamic effectiveness. Since the elevator effectiveness (pitching moment per unit deflection) is a function of speed CAS the KV signal is programmed in circuit 490 to compensate for this speed effect. The output of multiplier 480 is summed with the outer loop elevator command signal from summer 400 in summer 500 to form the total elevator command.

Figure 8A:
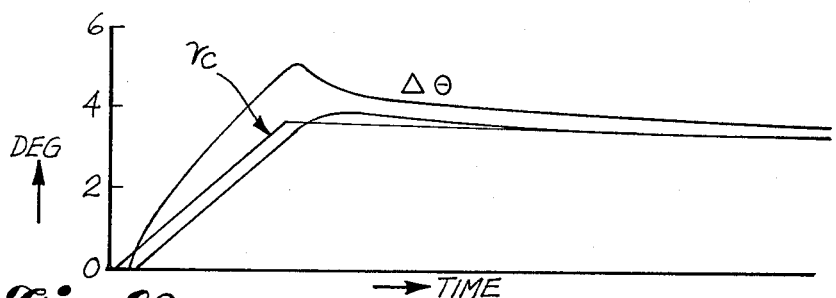
FIGS. 8a, 8b and 8c are response characteristics illustrating certain airplane dynamics as they relate to the response of the display signals and the desired characteristics of both.
Figure 8B:
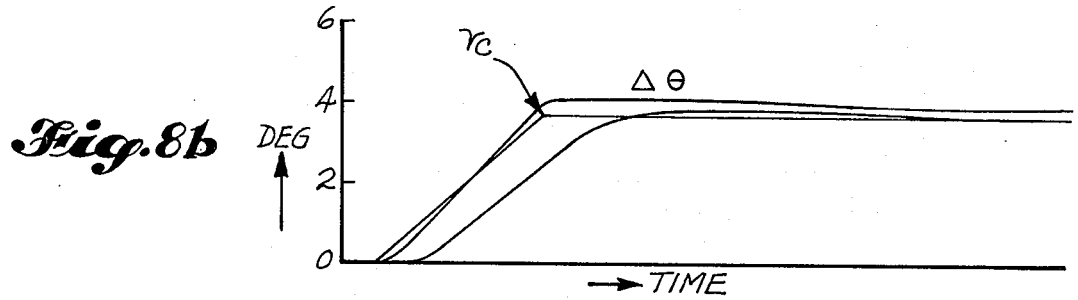

It should be understood that for proper functioning of the control law all signal gains in each of the signal paths must be determined in relationship to the other gains. In general, the overall gain levels were selected to minimize flight path angle response lag, commensurate with a high level of response damping and acceptable pitch attitude response. For example, it was found that the flight path angle response lag $\tau_{65}$ relative to $\gamma_c$ could be reduced to approximately 0.7 sec by increasing the gain levels to the highest level while still providing adequate damping. This is shown in FIG. 8a. The problem, however, is that the pitch rate response becomes jerky and the pitch attitude exhibits a relatively large overshoot of the steady state value. The pitch attitude response could be smoothed and the overshoot largely be avoided by lowering the overall gain levels, see FIG. 8b. This results however in an unacceptably sluggish flight path angle response. Therefore, a gain level was selected that compromises between a small $\gamma$ response lag and a small pitch attitude overshoot, resulting in a $\tau_\gamma \approx 1$ sec.

The small flight path angle response lag is desired when using the flight path angle display to close the short term pilot control loop and provide satisfactory control handling characteristics. (See the discussion with respect to FIG. 6) Even the smallest achievable response lag ($\tau_\gamma \approx 0.7$) was found to be too large. For this reason a $\gamma_c$ display was added. It basically responds lag free. The pilot can use the $\gamma_c$ display to close the short term control loop and divorce himself from the short term dynamics of the actual flight path angle.

Figure 9:
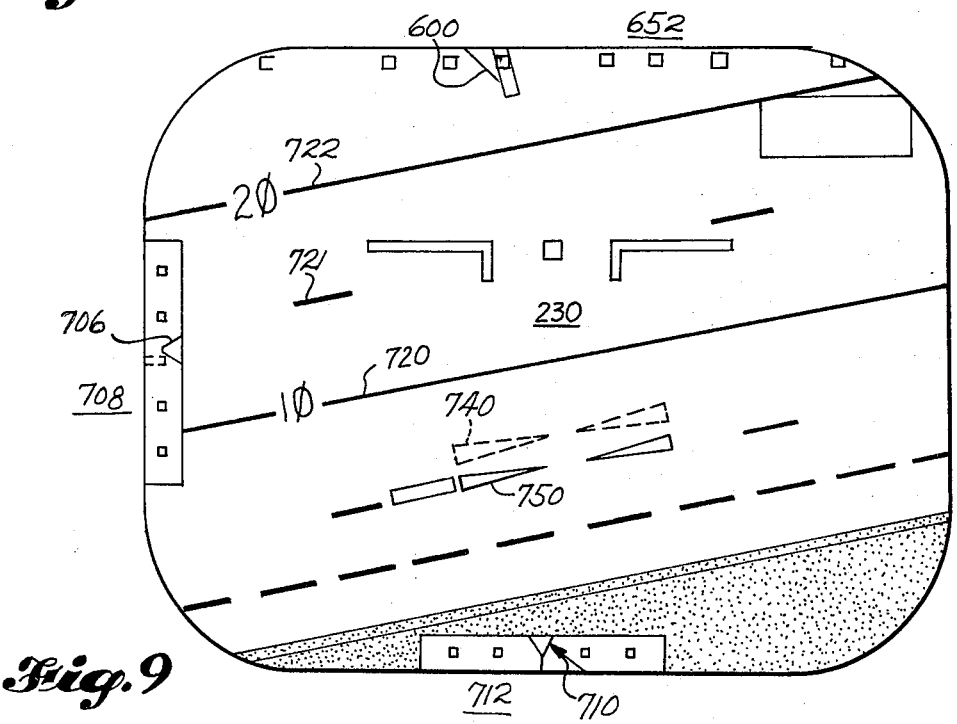
FIG. 9 illustrates the addition of the flight path angle command symbol to the vertical airplane situation display.

FIG. 9 depicts the preferred embodiment of the pilot display used in association with the instant invention. Here, as in the conventional manner, roll attitude is indicated via a roll pointer 600 relative to a suitable roll attitude scale, indicated generally at 652.

A landing system glide slope indicator 706 is provided with an appropriate scale, indicated generally at 708.

A landing system localizer indicator 710 is provided with an appropriate scale indicated generally at 712.

Various pitch lines 720-722 are indicated on the screen with a reference airplane symbol 230.

The principal improvement in the display is that simultaneous indications 740, 750 represent both the flight path command $\gamma_c$ and the actual flight path $\gamma_I$ respectively.

The $\gamma_c$ symbol has the same wedged shape as the actual flight path angle symbol, however, the lines are drawn in lighter and broken up. During tracking conditions both symbols overlay. The value of the flight path angle is read against the pitch scale. (The pitch attitude is determined by the airplane symbol position relative to this scale, however 5° nose up bias is applied to unclutter the symbology.) For example, when flying level, the flight path angle wedges overlay and point at the 0° (horizon) line. During the column inputs the $\gamma_c$ separates from the $\gamma$ symbol in proportion to the amplitude of the column input (and thus $\gamma_c$). When the column input is returned to neutral the $\gamma$ closes in on $\gamma_c$ in a quick and well damped way.

Display of the $\gamma_c$ signal further has the advantage that the pilot always knows the reference command that the automatic system is controlling to. This helps the pilot avoid entering the control loop to correct small flight path angle perturbations in turbulent conditions, which are best left to the automatic system.

Figure 8C:
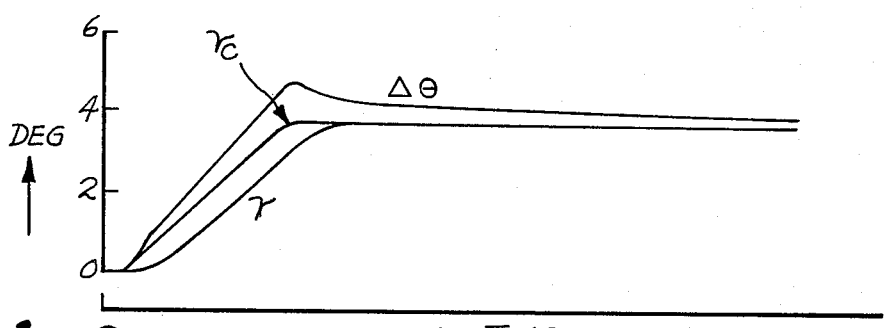

During pilot evaluations of the system so far described, it was found that the lag free $\gamma_c$ response appeared unnatural to the pilots. The $\gamma_c$ response would lead the pitch attitude response (see FIGS. 8a, 8b) and force the pilot to abandon his feel for the dynamics of a normal well-responding airplane. Both these problems were solved by the addition of a small (~0.2 seconds) first order lag in the $\gamma_c$ signal loop, which is shown as gain/lag circuit 250 in FIG. 7. The responses for the system including the $\gamma_c$ lag circuit and optimized gains are shown in FIG. 8c. Note that the resulting flight path angle response lag ($\tau_\gamma$) is ~1 second, that the initial and steady state rate of change of flight path angle are well coordinated and that the commanded flight path angle is captured in a well damped, overshoot free way.

Figure 10A:
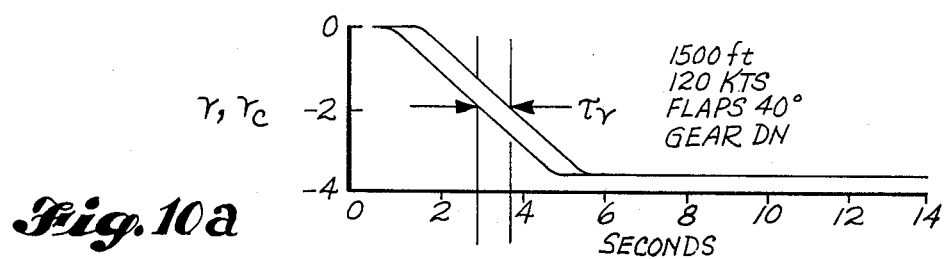
FIGS. 10a, 10b and 10c illustrate actual system responses for the improved flight path angle Control Wheel Steering system design according to the present invention.
Figure 10B:
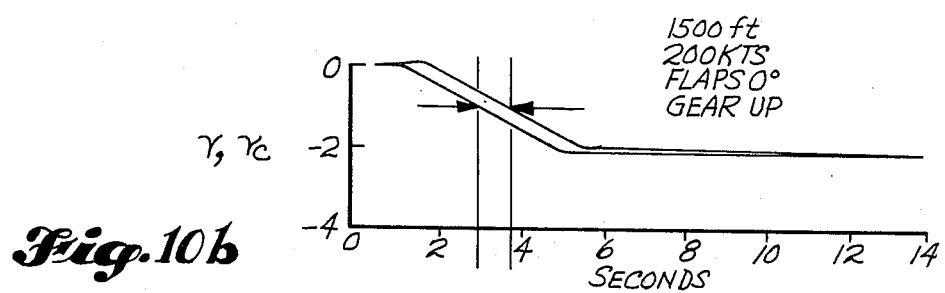
Figure 10C:
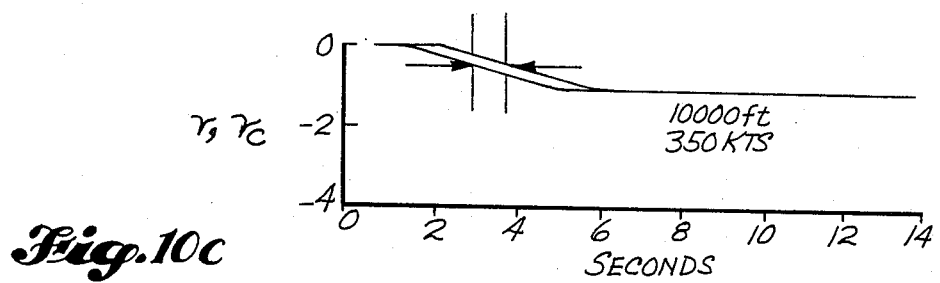

Finally, FIGS. 10a-c show examples of the responses at various speeds, using identical control column inputs. Note that the control coordination and response damping is maintained throughout the flight envelope and that the rate of change of $\gamma_c$ decreases with increased speed. Note also that the flight path angle response lag stays constant for all speeds. As a result, the airplane's control characteristics remain virtually the same throughout the flight envelope, while the normal acceleration response capability for full control column inputs stays constant.

Referring again to FIG. 7, the remaining portion of the control law relates to the automatic GO AROUND feature. When the airplane descends to critical altitude and all conditions of runway vision and airplane position relative to the runway or operation of all critical systems have not been met, the pilot must make a go around. This can be a critical maneuver at low altitude, demanding minimum altitude loss after the decision has been made. To assist the pilot in making this maneuver the automatic go around feature has been designed into this Velocity Vector Control Wheel Steering system. For this purpose the commanded flight path angle $\gamma_c$ is quickly but smoothly changed from whatever previous value existed before the activation of the go around logic, to a +2° climb-out value. This is done by taking the $\gamma_c$ and forming an error signal GAMEG relative to a +2° bias in summer 800. The error signal GAMEG is appropriately amplified in circuit 810 by a gain factor KGAE and then fed back through switch 820 to summer 240 and ultimately to the command integrator 260. Activation of the GO AROUND ENGAGE logic (GAE) results in a temporary closure of switch 820 and therefore in a quick but smooth synchronization of the $\gamma_c$ signal with the +2° climb bias. The airplane responds with a very positive and well controlled pull-up maneuver and establishes the 2° climb angle without overshoot, just as in the case of a pilot controlled maneuver. For this purpose the go around engage error signal GAMEG is fed back such that it not only changes the $\gamma_c$ value, but also results in a proportional pitch up command which is summed with the pitch rate signal in summer 470.

In summary, with the described design features, the control law and display system satisfies all requirements of responsiveness, damping, control sensitivity and flight path angle tracking in turbulence. Tests have shown that this system significantly reduces pilot workload over the system known to the prior art.

While a preferred embodiment of the invention has been described in detail, many modifications and variations thereto are possible, all of which fall within the true spirit and scope of the invention.

I claim:

1. An aircraft control and display system providing computer augmented manual steering capability comprising:
   control reference means for receiving and processing a signal representative of the pilot's steering input to develop a control reference signal which is proportional to the time integral of said pilot's steering input;
   aircraft sensing means for sensing and supplying a signal representative of the controlled state of the aircraft;
   control command means for processing said control reference signal and said signal representative of the controlled state of the aircraft to produce a control surface command that automatically controls the craft's dynamics to smoothly bring the controlled state to track the control reference value; and
   display means for displaying said control reference value and said controlled state of said craft to the pilot.

2. An aircraft longitudinal control and display system providing computer augmented manual flight path angle steering capability, comprising:
   first means for receiving and processing a signal representative of the pilot's steering input to produce a flight path angle command signal $\gamma_c$ which is proportional to the time integral of said pilot's steering input;
   second means for supplying a signal $\gamma$ representative of the craft's inertial flight path angle;
   third means for supplying a signal $\theta$ representative of the of the craft's pitch rate;
   fourth means for processing said $\gamma_c$ signal, said $\gamma$ signal and said $\theta$ signal to develop a control surface command that automatically controls the craft's dynamics to smoothly bring the value of said $\gamma$ signal to track the value of said $\gamma_c$ signal; and
   fifth means for displaying said $\gamma$ signal and said $\gamma_c$ signal permitting the pilot to monitor and control their values.

3. An aircraft vertical flight path angle steering and display system for controlling and monitoring the inertial flight path angle $\gamma$ of said craft comprising:
   first means for receiving and processing a signal representative of the pilot's longitudinal control input to produce a flight path angle command signal $\gamma_c$ which is proportional to the time integral of said longitudinal control input signal;
   second means for supplying a signal $\gamma$ representative of the craft's inertial flight path angle;
   third means for supplying a signal $\theta$ representative of the craft's pitch rate;
   fourth means for supplying a signal $\ddot{h}$ representative of the craft's vertical acceleration;
   fifth means for supplying a signal representative of the speed VGS of the aircraft;
   sixth means for processing said $\ddot{h}$ signal and said VGS signal to produce a signal $\dot{\gamma}$ representative of the rate of change of flight path angle according to the relationship $\dot{\gamma} = \ddot{h}/VGS$;
   seventh means for processing said $\gamma_c$ signal and said $\gamma$ signal to produce a signal $\gamma_\epsilon$, representative of the flight path angle error signal, according to the relationship $\gamma_\epsilon = \gamma_c - \gamma$;
   eighth means for processing said $\gamma_\epsilon$ signal, said $\dot{\gamma}$ signal and said $\theta$ signal for developing an elevator command to control the craft's dynamics in such a way as to reduce the $\gamma_\epsilon$ signal to zero; and
   ninth means for displaying said inertial flight path angle signal $\gamma$ and said flight path angle command signal $\gamma_c$ to the pilot in proper relationship with the aircraft's pitch attitude.

4. The vertical flight path angle steering and display system of claim 3 in which said first means includes:
   means for amplifying said longitudinal pilot's control input by a gain factor which is inversely proportional to speed before integrating said amplified longitudinal control input signal to produce said $\gamma_c$ signal.

5. The vertical flight path angle steering and display system of claim 3 in which said signal representative of the pilot's longitudinal control input of said first means represents the craft's control column position.

6. The system of claim 4, wherein said speed for programming the integration rate of said pilot's longitudinal control input represents the groundspeed of said craft.

7. The system of claim 4, wherein said longitudinal pilot's control input signal which has been amplified by a gain factor inversely proportional to speed is further processed through a small lag circuit before being integrated producing said $\gamma_c$ signal to provide the desired dynamic response characteristic of said $\gamma_c$ signal for display to the pilot.

8. The system of claim 7, wherein the processing of said eighth means consists of a proportional signal path of said $\gamma_\epsilon$ signal, a proportional signal path of said signal including a low pass filter, and an integrator signal path having both $\gamma_\epsilon$ and $\dot{\gamma}$ signal inputs, a summer circuit for combining said proportional $\gamma_\epsilon$ signal path, said proportional $\dot{\gamma}$ signal path and the output of said integrator having both $\gamma_\epsilon$ and $\dot{\gamma}$ signal inputs, for producing a signal representative of the outer loop elevator command.

9. The system of claim 8, further including:
   means for processing a signal CAS representative of the craft's speed to produce a speed related gain programming factor KV;
   means for high pass filtering and gain amplifying said $\theta$ signal;
   means for low pass filtering said pilot control input signal which includes a gain factor inversely proportional to speed to provide a signal COLP representative of the pitch rate command;
   means for combining said high pass filtered and gain amplified $\theta$ signal and said COLP signal to produce a signal representative of the pitch rate error;
   means for multiplying said pitch rate error signal with said speed related gain factor KV, producing an inner loop elevator command signal; and
   means for combining said outer loop elevator command and said inner loop elevator command to form a total elevator command signal.

10. The system of claim 9, further including a go around circuit, for synchronizing the value of said $\gamma_c$ upon activation of a go around discrete logic automatically to a preferred go around bias signal, for executing a go-around maneuver.

* * * * *